United States Patent
Norton et al.

(10) Patent No.: US 7,124,553 B2
(45) Date of Patent: Oct. 24, 2006

(54) CONTINUOUS ROLL STOCK NETTING MACHINE

(75) Inventors: Eddie Norton, McDonough, GA (US); Duane McGregor, Algona, IA (US); Jeff Christensen, Algona, IA (US)

(73) Assignee: Poly-Clip System Corp., Mundelein, IL (US)

( * ) Notice: Subject to any disclaimer, the term of this patent is extended or adjusted under 35 U.S.C. 154(b) by 0 days.

(21) Appl. No.: 11/194,321

(22) Filed: Aug. 1, 2005

(65) Prior Publication Data

US 2006/0021292 A1 Feb. 2, 2006

Related U.S. Application Data

(60) Provisional application No. 60/648,529, filed on Jan. 31, 2005, provisional application No. 60/592,984, filed on Jul. 30, 2004.

(51) Int. Cl.
- *B65B 51/04* (2006.01)
- *B65B 25/06* (2006.01)
- *B65B 9/10* (2006.01)

(52) U.S. Cl. ................... 53/138.2; 53/567; 53/576

(58) Field of Classification Search ............... 53/417, 53/138.1–138.4, 567, 574–579; B65B 51/04
See application file for complete search history.

(56) References Cited

U.S. PATENT DOCUMENTS

| | | | | |
|---|---|---|---|---|
| 3,719,022 A | * | 3/1973 | Cherio et al. | 53/576 |
| 3,805,480 A | * | 4/1974 | Cherio et al. | 53/576 |
| 4,495,751 A | * | 1/1985 | Galbiati | 53/576 |
| 4,590,748 A | * | 5/1986 | Harrison et al. | 53/576 |
| 4,649,601 A | * | 3/1987 | Kollross | 53/576 |
| 4,771,510 A | * | 9/1988 | Kawai | 53/567 |
| 6,067,774 A | * | 5/2000 | Sauer | 53/409 |
| 6,883,297 B1 | * | 4/2005 | Kirk et al. | 53/138.2 |

\* cited by examiner

*Primary Examiner*—Stephen F. Gerrity
(74) *Attorney, Agent, or Firm*—Trexler, Bushnell, Giangiorgi, Blackstone & Marr, Ltd

(57) ABSTRACT

An apparatus for encasing material in continuous roll stock netting is described. The apparatus has a product horn axially aligned with and diametrically opposed to a mandrel over which continuous roll stock netting has been placed. The mandrel is movable into a passageway between two gates and the netting is engaged by a set of claws, after which the mandrel retracts. A set of claws holds the netting open as a ram pushes the material through the product horn into the open netting. The first gate gathers the open end of the netting for closure by a clipper. The second gate gathers the netting and a set of adjustable clamps retracts the netting, pulling the netting tightly over the material. A second clipper clips and severs the gathered netting to enclose the material in the netting.

7 Claims, 8 Drawing Sheets

CONTINUOUS ROLL STOCK NETTING MACHINE

PRIORITY

This application claims the benefit of domestic priority of U.S. Provisional Application Ser. No. 60/592,984, filed on Jul. 30, 2004, and U.S. Provisional Application Ser. No. 60/648,529, filed on Jan. 31, 2005, both of which are incorporated herein by reference.

BACKGROUND OF THE INVENTION

This invention relates to the field of preparing products in netting. The invention is directed to preparation of food products in netting, such as hams or turkeys, and will be described specifically as used for hams. The invention is also directed to preparation of food products in casing. The invention can also be used for other food products such as chickens, sausages, cheeses, or vegetarian products. Additionally, the invention can be used to encase and/or net products other than foods.

Traditionally, meat products were enclosed in netting prior to processing. Removal of the netting after processing, whether it be cooking, smoking, curing, aging, or otherwise, often resulted in some of the meat products sticking to the netting and being pulled off during the removal process, leaving an unsightly appearance unpleasant to consumers.

The use of edible collagen films solved this problem. Meat products, including hams, turkeys, sausages, and whole-muscle products, are now conventionally enveloped in an edible collagen film. In the prior art, flat sheets of collagen film were turned over plows to form a tubular casing. More recently, meat products have been extruded through a tube or horn through a shir housing on which a tubular edible collagen film has been shirred. This method is described in, for example, copending U.S. patent application Ser. No. 10/695,115, Apparatus And Method To Net Food Products In Shirred Tubular Casing, and its continuation-in-part, copending U.S. patent application Ser. No. 10/867,977, Apparatus And Method To Net Food Products In Shirred Tubular Casing.

The encased meat product is then wrapped in a net and the product is further processed, such as cooking, aging, or smoking, as also described in, for example, the '115 and '977 applications described above.

The netting allows the processor to hang the meat product, whether it is a ham, turkey, or sausage, in a processing compartment. The processing step, whether it is smoking, steaming, cooking, curing, or otherwise, causes the meat to expand, pushing the meat against the netting and creating a dimpled appearance on the meat product. This dimpled appearance is considered pleasing to consumers. After the meat has been processed, the netting is removed easily, as it does not stick to the collagen film.

Various collagen films can be used, including flavored and colored films, to create various taste sensations or appearances. Additionally, some netting is treated prior to use. For example, smoke flavoring can be impregnated into the netting, which then seeps into the meat during processing to enhance the flavor of the meat. Also, the netting can be treated with a chemical that enables easy stripping of the netting from the meat after processing, so that the netting can be removed without pulling off chunks of meat. The product then is often wrapped in a clear film for sale.

Some food products, such as hams and turkeys, are wrapped in nets for final sale to consumers. For example, large fowl, particularly turkeys, are encased in a plastic, see-through wrapper, for sanitary reasons, and then enclosed in netting for package integrity and ease of handling. The netting provides a strong structure to hold the turkey and allows the consumer to see the packaged material. It is important that the netting be tight around the package, to provide a pleasing appearance to consumers. There is a marketing advantage to having tightly-netted packages.

In many cases, a handle or a hook is also applied to the package. Sausages and hams are often enclosed in netting prior to cooking or smoking. The use of a handle or hook is mandated in this situation, as there must be some way to handle the product in the cooking or smoking apparatus. The handles on these products are generally discarded after processing.

A handle is also useful to workers and customers in retail establishments, especially when the product is frozen, to make it easier to grab the product. A handle facilitates maneuvering the products, such as moving the products in and out of display cases, through checkout lanes, or in and out of the consumer's own refrigerator or freezer. Additionally, some consumers prefer to use a handle in order to avoid touching the package itself. Accordingly, there is a marketing advantage to having a handle on the product. In the case of turkeys or other poultry, it is important that the handle be applied at the rear-most point of the birds, which is where the legs point, to provide a pleasing appearance to purchasers.

Most of the same products also have a label of some type applied to the product. The label displays such data as weight, price per unit of weight, and total price. Other data, such as lot numbers, batch identification, product identification, or expiration date, are also common. The label can also contain identification information such as brand names or logos.

The netting process was traditionally done manually. Netting is manufactured in a long, continuous tube, usually of a plastic material but also from natural fibers. In the prior art, the tube of netting was rucked onto a product horn. (As used in this specification, the term "ruck" refers to the process of gathering a continuous tube of netting material over a tube or horn.) The netting was clipped at a first end of the product horn and the ham or a turkey in netting was placed in the second end of the product horn and pushed through. The ham or turkey contacted the clipped end of the netting and, as the ham or turkey was pushed through the product horn, was encased in the netting. A worker gathered the netting around the turkey or ham and clipped it to close the netting. The worker gathered the netting into a loop if a handle was to be applied. Sometimes precut netting is used, but the ham or turkey was still manually placed in the netting tube.

This prior art method was labor intensive. Additionally, it was difficult to obtain uniform tightness of netting. Additionally, the method required quite a bit of manual pulling and wrapping, making hand fatigue and injuries common. Moreover, the use of precut netting added a step in the manufacturing process and often resulted in wasted, excess netting.

Accordingly, automated or partially automated processes have been developed to net products such as hams and turkeys. These processes generally involve pushing the product into the proximal end of a product horn, which is inside and coaxial to a netting tube on which netting has been rucked. The distal end of the netting tube is clipped, the ham or turkey is pushed through the product horn, abutting against the clipped end of the netting tube, and as the ham or turkey exits the distal end of the tube, it pulls the rucked netting of the netting tube. The netting is then gathered around the product and clipped and severed. Clippers (which have integral cutters for severing the netting) are well-known in the art. An automated process for netting is disclosed in, for example, copending U.S. patent application Ser. No. 10/787,988, Automated Netter, filed Feb. 26, 2004.

The netting used in these processes usually arrives from the manufacturers in a flattened state and wrapped in a roll. Sometimes the netting is supplied loosely draped in a box. Typically, the netting is sold in a continuous roll stock, 1,200 to 1,500 feet long. In order to be used in an automated or partially-automated process as described above, the roll of netting has to be rucked onto a temporary netting tube. This rucking involves placing the netting coaxially onto the netting tube. Once the netting has been rucked onto the netting tube, the tube is placed coaxially over the product horn as described above. A typical netting tube will hold far less than the 1,200 to 1,500-foot lengths sold by netting manufacturers.

Various methods to ruck netting onto a netting tube are known in the art. All such methods, however, involve a separate netting tube that, once the netting has been rucked onto it, is placed over the product horn. Thus, disruptions and inefficiencies result. An extra employee is needed to ruck the netting onto the netting tube at a separate station from the netting machine. Once enough netted product has been created to deplete the supply of netting on the netting tube, the netting process must stop while the empty netting tube is removed. The process must await a new supply of netting, either for the time it takes to ruck new netting onto the sole netting tube or at least for the time it takes to unload the empty tube and attach a spare tube with rucked netting. Thus, the expenses of at least one extra netting tube is often required, as well as the expense of a separate rucking apparatus and the expense to operate that separate apparatus. Under any of the prior art methods, downtime and increased labor costs result.

Accordingly, a need exists for an apparatus and method to produce netted products, such as hams and turkeys, in a more continuous process. The present invention fulfills this need.

BRIEF SUMMARY OF THE INVENTION

The present invention allows for continuous production of netted products by axially aligning but diametrically opposing the product horn and the netting operation. The present invention is in a first embodiment an apparatus for encasing material in netting, comprising a tube of netting having an open end, a first gate adjustable from an open position defining an aperture larger than the material, to a closed position gathering the netting extended through the aperture, a second gate adjustable from an open position defining an aperture larger than the material, to a closed position gathering the netting extended through the aperture, the first gate being spaced from the second gate to define a passage therebetween, a set of claws mounted on a collar and positioned proximal to the first gate, a mandrel mounted on a plurality of clamps, in axial alignment with a product horn, and being adapted to receive the tube of netting and to maintain the open end in an open position in axial alignment with and opposed to a distal end of the product horn, each of the clamps having an open setting so that the mandrel and the netting can move relative to the clamp, an intermediate setting so that the mandrel can move relative to the clamp and the netting cannot move relative to the clamp, and a closed setting so that the mandrel and the netting cannot move relative to the clamp, a means to move the mandrel from a first position distal to the collar, through the gates to a second position wherein the claws engage the netting and hold the open end in an open position, a means to move the product horn, from a first position proximal to the collar, to a second position in the passage, a ram to move the material into the product horn and to leave the material in the passage when the product horn moves from its the second position to its the first position, a first clipper associated with the first gate and positioned to clip the netting gathered by the first gate to close the open end, and a second clipper associated with the second gate and positioned to clip and sever the netting gathered by the second gate.

DETAILED DESCRIPTION OF THE INVENTION

The organization and manner of the preferred embodiments of the invention, together with further objects and advantages thereof, may best be understood by reference to the following description of the preferred embodiment of the invention, taken in connection with the drawings. Please note that the following description is the preferred embodiment as used to net hams. The same apparatus and method can be used to net hams, turkeys, sausages, cheeses, vegetarian food products, or inedible products.

Figure 1:
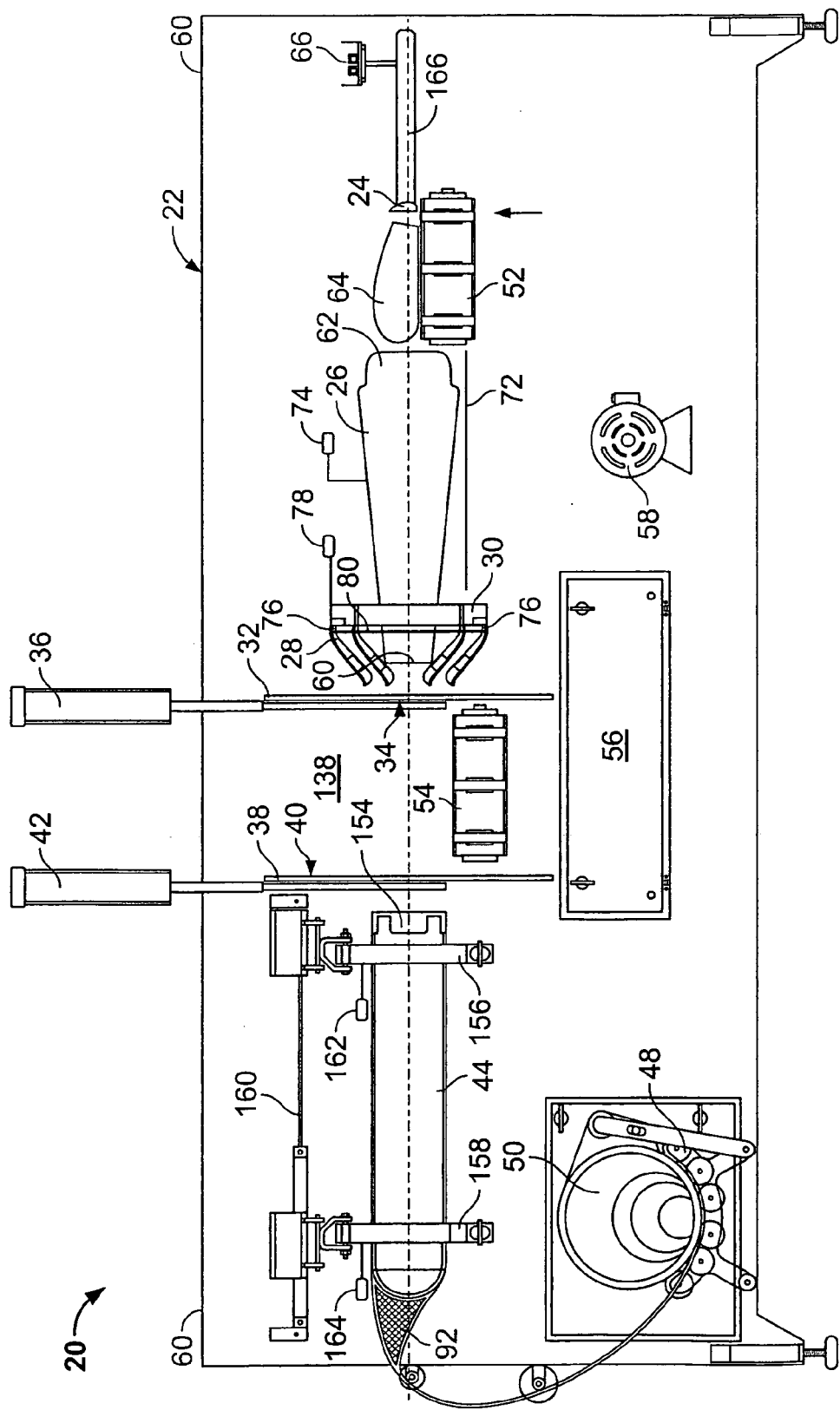
FIG. 1 is an elevation view of the apparatus of the preferred embodiment of the present invention, showing an initial configuration.

The apparatus 20, as shown in FIG. 1, has basic components of a frame 22, a ram 24, a product horn 26, a set of claws 28 mounted on a collar 30, a first gate 32 with an associated first iris 34 and first clipper 36, a second gate 38 with an associated second iris 40 and second clipper 42, a mandrel 44 for holding continuous roll stock netting 46, a set of rollers 48 in a trunnion mount 50, a product delivery conveyor 52, a finished product conveyor 54, and electronic controls 56. As the preferred embodiment is directed to use in food establishments, all components are preferably made of stainless steel or other easily washed and sanitized material.

In the preferred embodiment, air-actuated cylinders move or actuate at least the ram 24, the claws 28, the product horn 26, and the irises 34, 40, as well as other components as will be described. Accordingly, a pressurized air supply 58 is required for the preferred embodiment. Other types of actuated cylinders can be used, as is familiar to those of skill in the art.

The frame 22 has a distal end 60 and a proximal end 62. The frame 22 is designed to hold all the components of the apparatus 20, but the components can be separately mounted if desired.

Product delivery conveyor 52 delivers product to be netted, such as a ham 64, at the proximal end 62 of the apparatus 20. In the preferred embodiment, the product conveyor 52 is a sixteen-inch wide conveyor belt with two-inch high cleats arranged every fifteen inches, in order to accommodate standard hams. Other conveyor belts can be used, or an operator can load the apparatus 20 manually and the product delivery conveyor 52 can be eliminated.

Figure 2:
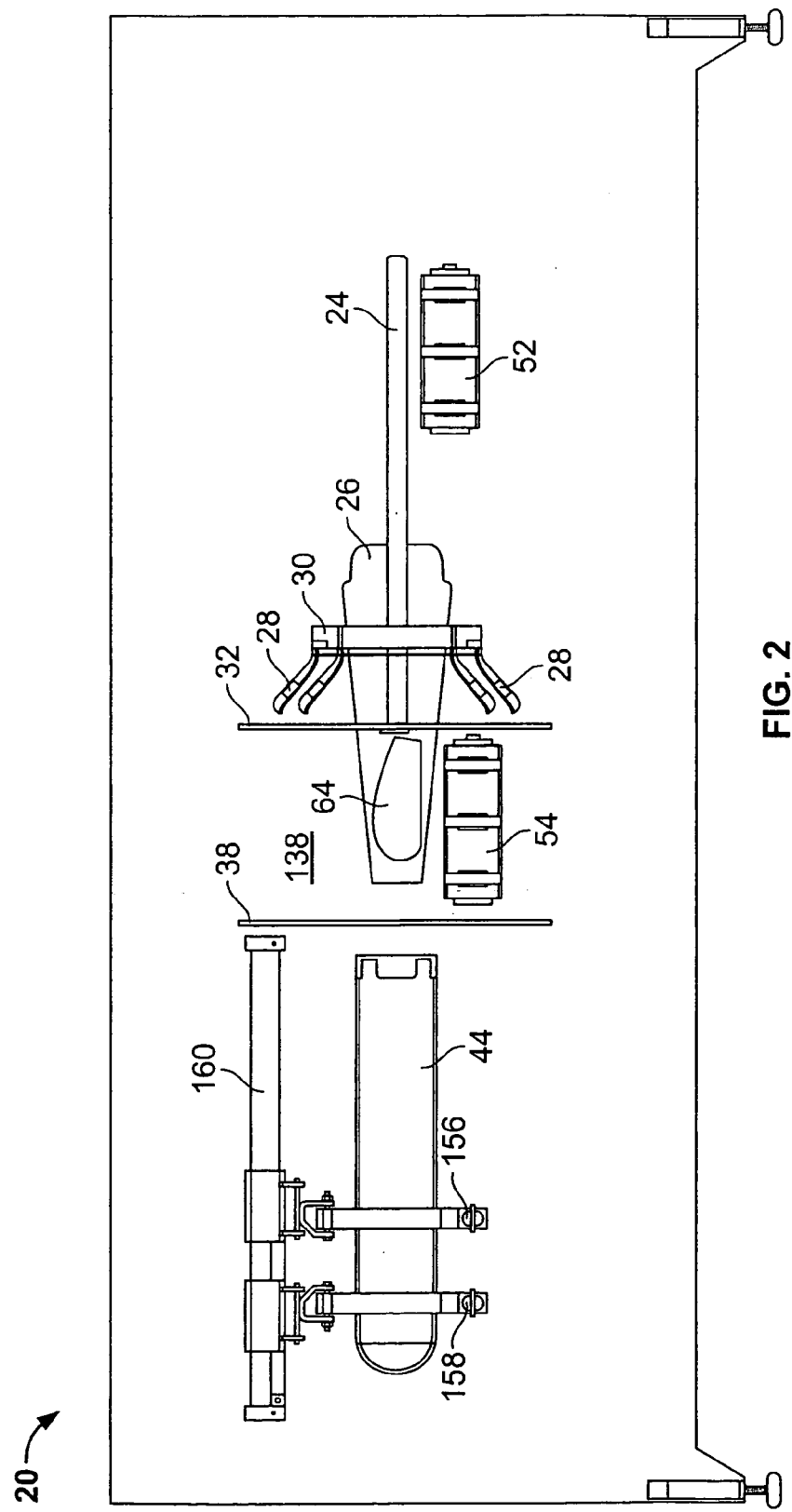
FIG. 2 is an elevation view of part of the apparatus of the preferred embodiment of the present invention, showing another configuration.

The ram 24 is attached to the frame 22 near the proximal end 62 and operates preferably by an air-actuated cylinder 66. The ram 24 moves in a proximal-to-distal direction and back again, from a first position adjacent to the proximal end 62 of the frame 22, as shown in FIG. 1, to a second position remote from the proximal end 62 of the frame 22, as shown in FIG. 2. (Please note that those elements of the apparatus that are not material to in the position changes are omitted from FIGS. 2, 4, 5, and 6 for clarity.)

The product horn 26 is an elongated tube having a passageway therethrough. In the preferred embodiment, the product horn 26 has a large opening at its proximal end 68 and narrows to a smaller opening at the distal end 70. The cross-sectional size of the distal end 70 should be large enough to pass the largest ham 64 to be processed by the apparatus 20. The narrowing nature of the duckbill shape of the product horn 26 from proximal opening 68 to distal opening 70 tends to align a ham 64 as it proceeds through the duckbill shape of the product horn 26, so that the ham 64 exits the duckbill with its longest axis aligned in a proximal-to-distal orientation.

The product horn 26 is movably connected to the frame 22. In the preferred embodiment, the product horn 26 slides along rails 72 attached to the frame 22 in a proximal-to-distal orientation. The product horn 26 could also be mounted on wheels, ball bearings, a monorail, or any other means that permits back-and-forth motion. In the preferred embodiment, an air-actuated cylinder 74 moves the product horn 26 back and forth.

A collar 30 is mounted rigidly to the frame 22. A set of claws 28 is mounted circumferentially around the collar 30. In the preferred embodiment, there are four claws 28, but a different number can be used. The claws 28 attach to the collar 30 by axles 76 which allow the claws 28 to rotate from a closed position toward the axis of the collar 30, as they appear in FIG. 1, thereby defining a circle smaller than the distal opening 70 of the product horn 26, to an open position away from the outer diameter of the collar 30, as the claws 28 appear in FIG. 2, thereby defining a circle larger than the distal opening 70 of the product horn 26. In the preferred embodiment, an air-actuated cylinder rotates the claws 28 about their axles 76 between the open and closed positions. Each claw 28 preferably has an associated air-actuated cylinder 78 (although a single cylinder 78 is illustrated for clarity). Alternatively, a single air-actuated cylinder 78 could operate all the claws 28 by means of suitable linkages. In another embodiment, a rubber or elastomeric band biases the claws 28 inward so that the claws 28 are in a normally closed position.

Figure 7A:
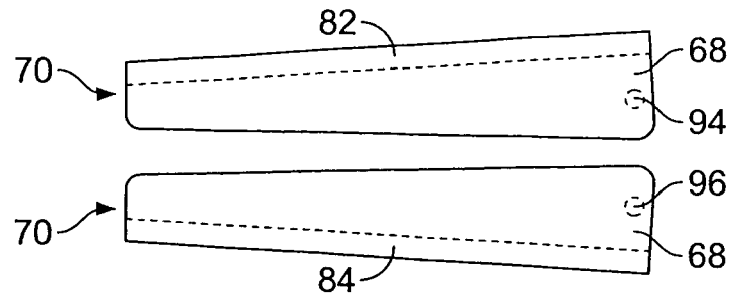
FIGS. 7A through 7C are views of an alternative product horn of an embodiment of the present invention.
Figure 7B:
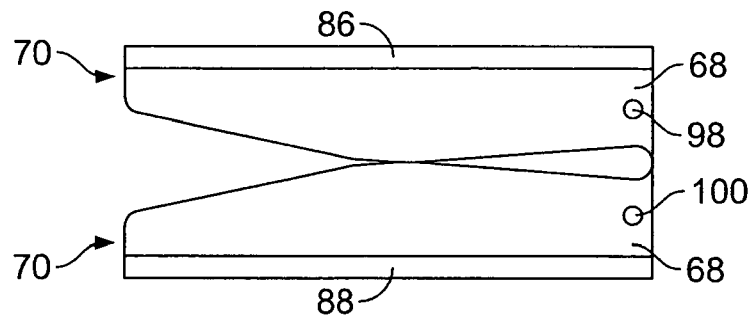
Figure 7C:
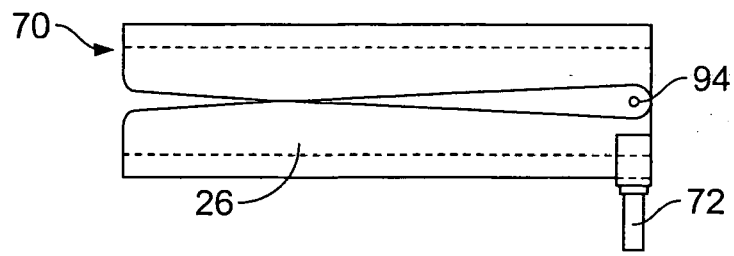
Figure 7D:
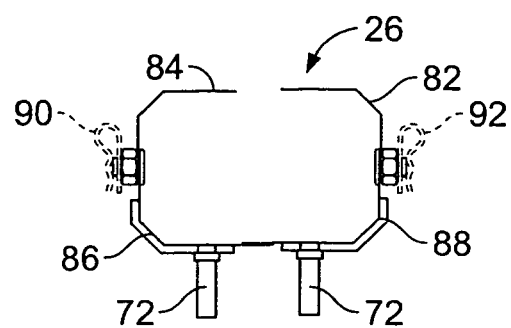

In another embodiment, the product horn 26 is made of four blades 82, 84, 86, and 88, as shown in FIGS. 7A through 7D. FIG. 7A shows a top view of blades 82 and 84. FIG. 7B is a plan view of blades 86 and 88. FIG. 7C shows a side view of the four blades 82, 84, 86, and 88 as assembled. FIG. 7D shows a front view of the four blades 82, 84, 86, and 88 as assembled.

Each blade 82, 84, 86, and 88 has an L-shaped cross section. The blades 82, 84, 86, and 88 are attached by pins 90, 92 through apertures 94, 96, 98, 100, at the proximal end 68 of product horn 26. The blades 82, 84, 86, and 88 are biased inward at the distal end 70 of product horn 26 by suitable means, such as air cylinders, springs or elastic bands. Accordingly, the four blades 82, 84, 86, and 88 are elongated members that form an adjustable chute through which the material such as a ham 64 can pass. The blades 82, 84, 86, and 88 are normally in their closed positions, forming a chute with a cross section approximately the size of the smallest material contemplated for the apparatus.

When material such as a ham 64 is pushed into product horn 26, it pushes the distal ends of blades 82, 84, 86, and 88 outwards to accommodate the ham 64. The apparatus 20 using product horn 26 otherwise operates in the same manner as described herein. By using moveable blades 82, 84, 86, and 88, however, the ham 64 is kept centered within product horn 26, improving the operation of apparatus 20. Furthermore, product horn 26 can auto-adjust to any size product, making apparatus 20 more versatile for different sizes of products.

Figure 3:
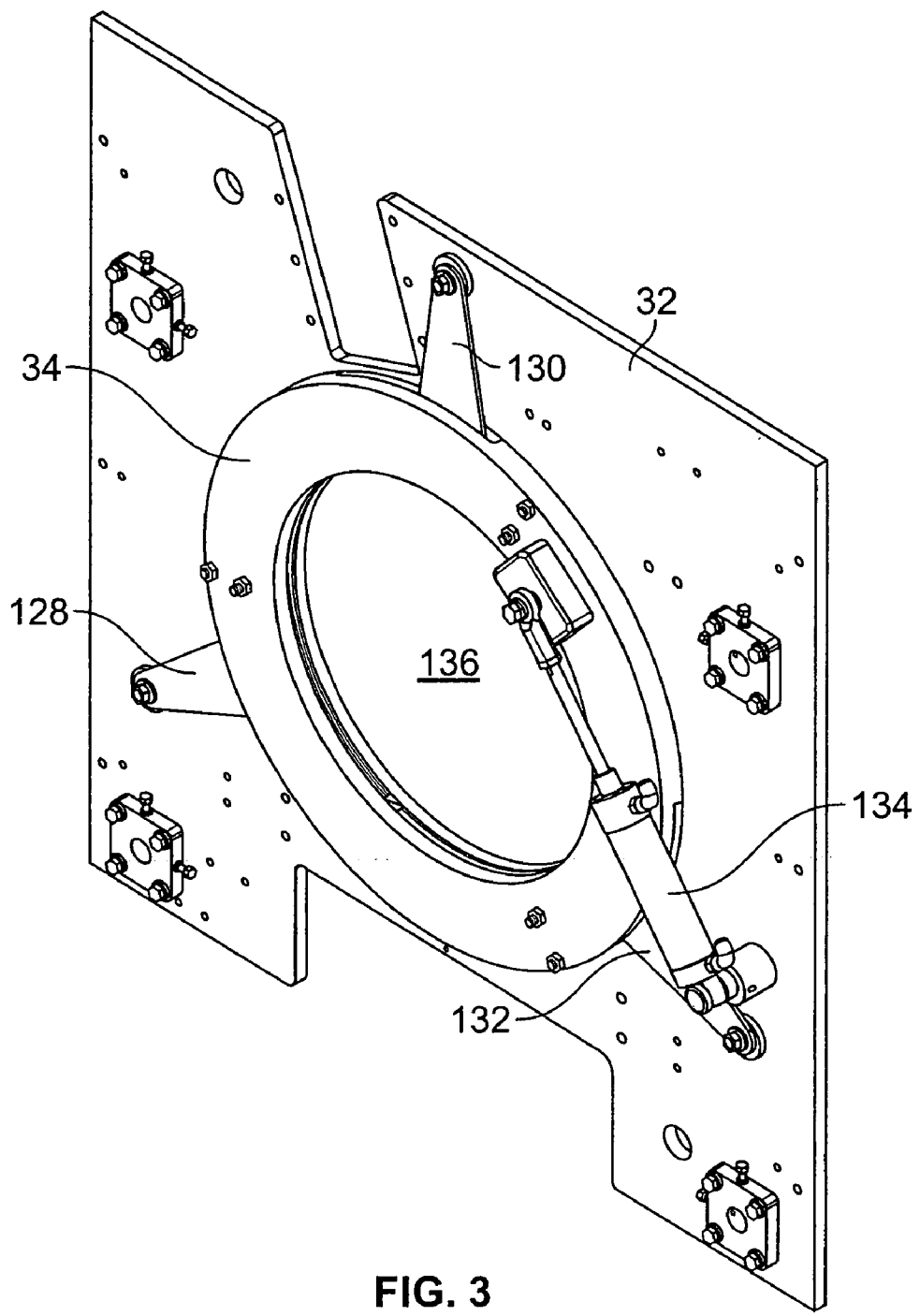
FIG. 3 is a perspective view of one of the gates and iris assemblies of the preferred embodiment of the present invention.

The first gate 32, shown in perspective view in FIG. 3, is rigidly mounted to the frame 22 and contains a first iris 34. The first iris 34 is made preferably of three separators 128, 130, and 132, actuated by a first iris separator cylinder 134. The three separators 128, 130, and 132 of the preferred embodiment operate like a camera lens, to open to allow material, such as a ham 64, to pass through. Accordingly, the three separators 128, 130, and 132 move from an open position, defining an aperture 136 large enough to accommodate the largest hams 64 that will be processed, as shown in FIG. 3, to a closed position, defining an aperture 136 large enough only to accommodate gathered netting. The iris 34 alternatively can have different numbers of separators, such as two opposed separators or four or more separators.

A first clipper 36 is attached to the first gate 32 and is a standard clipper, such as a clipper sold by Poly-Clip System Corp. In the preferred embodiment, first clipper 36 only clips the netting 46 and an integral knife is not needed. In another embodiment, first clipper 36 clips the netting 46 and also trims the excess, in which case a knife integral to first clipper 36 is necessary.

The product horn 26 moves through the collar 30, when the claws 28 are in the open position, and through the aperture 136 of the first gate 32, from a first position, proximal to the first gate 32, as it appears in FIG. 1, to a second position, through the first gate 32, as it appears in FIG. 2.

A second gate 38 is rigidly mounted to the frame 22, at a position distal to the first gate 32, such that a passage 138 is defined between the first gate 32 and the second gate 38, slightly larger than the largest hams 64 that will be processed in the apparatus 20. (The second gate 38 and its associated components are largely identical to the first gate 32 and its components, as shown in FIG. 3, and accordingly are not separately illustrated.) The second iris 40 is made preferably of three separators 142, 146, and 148, actuated by a second iris separator cylinder 150. The three separators 142, 146, and 148 of the preferred embodiment operate like a camera lens, to open to allow the mandrel 44, as will hereinafter be defined, to pass through. Alternatively, the separators 142, 146, and 148 can have other configurations, as discussed above with respect to first iris 34. Accordingly, the three separators 142, 146, and 148 move from an open position, defining an aperture 152 large enough to accommodate the mandrel 28, to a closed position, defining an aperture large enough only to accommodate gathered netting.

A second clipper 42 is attached to the second gate and is a standard clipper, such as a standard Poly-Clip clipper. Second clipper 42 must sever the netting 46 and accordingly has an integral knife.

A product delivery conveyor 54 is mounted directly below the passage 138. The product delivery conveyor 54 is preferably a standard belt conveyor, but any device to carry netted products away from the apparatus 20 will suffice. In one embodiment, the netted products drop off the end of product delivery conveyor 52 into a shipping crate. In another embodiment, a product tray is located below the passage 138. When a completed product is received in the product tray, an air-actuated cylinder operates to tilt the product tray to dump the completed product, either to a conveyor belt or to a holding table for manual removal by an operator.

A set of rollers 48 carried in a trunnion mount 50 is attached to the frame 22 or at least placed below or adjacent to the frame 22, distal to the second gate 38. The netting 46 is mounted on the set of rollers 48, rolled up in the continuous roll stock that came from the manufacturer. Alternatively, a box of netting as produced by a netting manufacturer is placed below or adjacent to frame 22, distal to the second gate 38. Accordingly, no netting tube is required, nor is a separate rucking station. The set of rollers 48 controls the feed of the netting 46 to the remainder of the apparatus 20, as will hereinafter be described.

A mandrel 44 is located directly above the set of rollers 48. The mandrel 44 is preferably an elongated cylinder, of approximately the same outer diameter as the distal opening 70 of the product horn 26. Other cross-sectional shapes of mandrel 44 are possible. The mandrel 44 has notches 154 at the proximal end to accommodate the claws 28, as will be hereinafter described. There is preferably one notch 154 per claw 28.

The mandrel 44 requires a novel mounting attachment to the frame 22. Because the netting 46 will be pulled over the mandrel 44, and the netting 46 must slide along the length of the mandrel 44 in a distal-to-proximal direction, the mandrel 44 is carried by a pair of clamps, a proximal clamp 156 and a distal clamp 158. Each clamp 156, 158 is preferably molded of plastic and has a ratchet-type hinge. At any given moment, at least one clamp 156, 158 is holding the mandrel 44.

The proximal clamp 156 is attached to an overhead rail 160 mounted to the frame 22, at a location distal to the second gate 38. Thus, the proximal clamp 156 can move from a first position just distal to the second gate 28, as shown in FIG. 1, to a second position remote to the second gate 28, as shown in FIG. 2.

Figure 4:
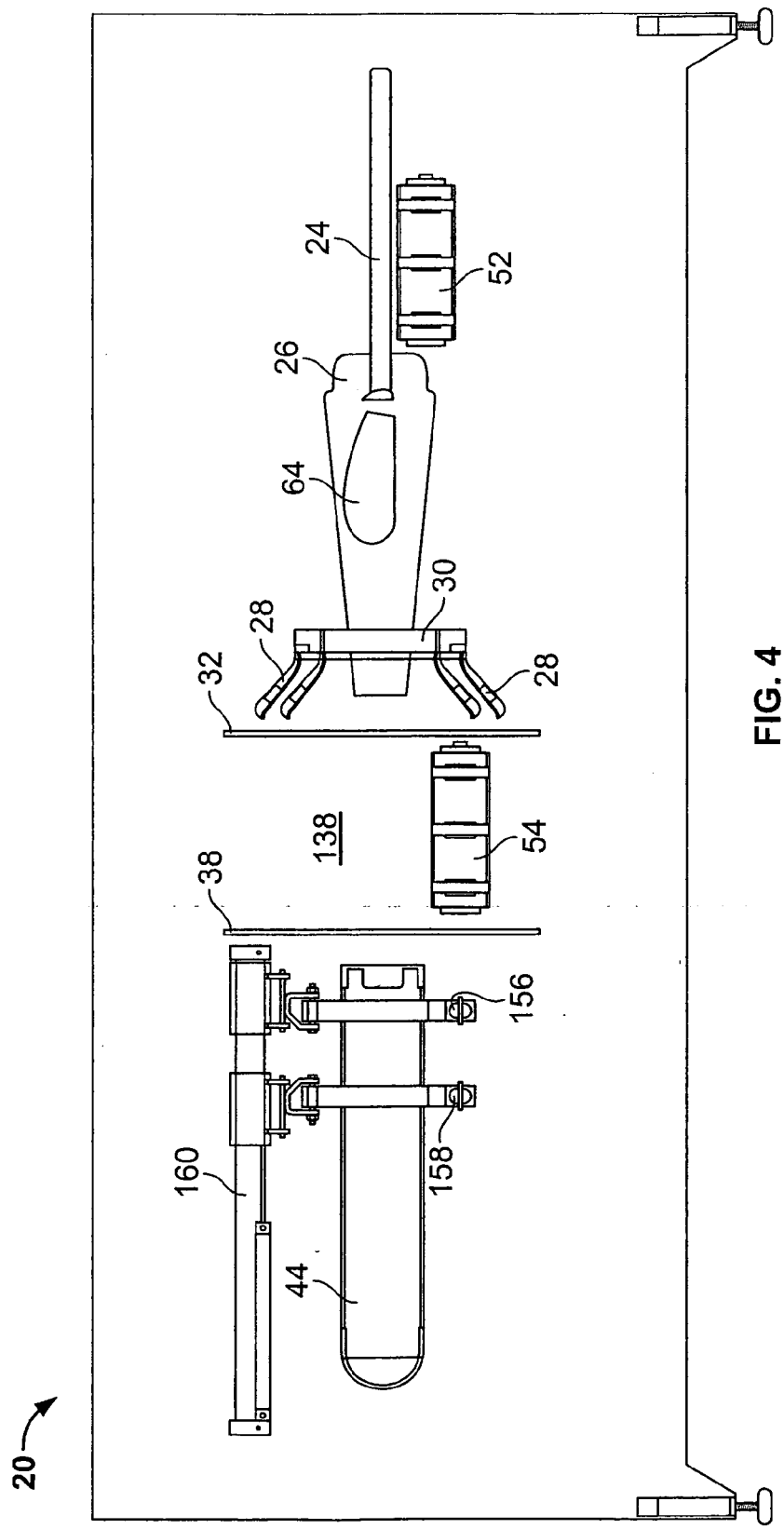
FIG. 4 is an elevation view of part of the apparatus of the preferred embodiment of the present invention, showing yet another configuration.

The distal clamp 158 is attached to overhead rail 160 mounted to the frame 22, at a location distal to the second gate 28. Thus, the distal clamp 158 moves from a first position remote from the second gate 28, as shown in FIG. 1, to a second position just distal to the proximal clamp 156 when in its first position, as shown in FIG. 4. Separate air-actuated cylinders 162, 164 drive the clamps 156, 158 back and forth.

Both clamps 156, 158 have three grip settings, open, intermediate, and closed. A clamp in the open setting is not gripping either the mandrel 44 or the netting 46, so that both mandrel 44 and netting 46 can move freely relative to that clamp. A clamp in the closed position is gripping the mandrel 44 and netting 46 tightly, so that neither mandrel 44 nor netting 46 can move relative to that clamp. A clamp in the intermediate position is gripping the mandrel 44 loosely, so that the mandrel 44 can move relative to that clamp (or the clamp can move relative to the mandrel 44) but the clamp will grip the netting 46.

The mandrel 44, when mounted in the clamps 156, 158 is axially aligned with the product horn 26. Accordingly, the axis of the mandrel 44, the central point of the second iris 40, the central point of the first iris 34, the central point of the distal opening 70 of the product horn 26, the central point of the collar 30, and the axis of the ram 24, generally define an apparatus axis 166. Accordingly, the mandrel 44, the product horn 26, and the ram 24 all move axially generally along the apparatus axis 166. The first iris 34, the second iris 40, and the collar 30 all are oriented to center on the apparatus axis 166.

Figure 8:
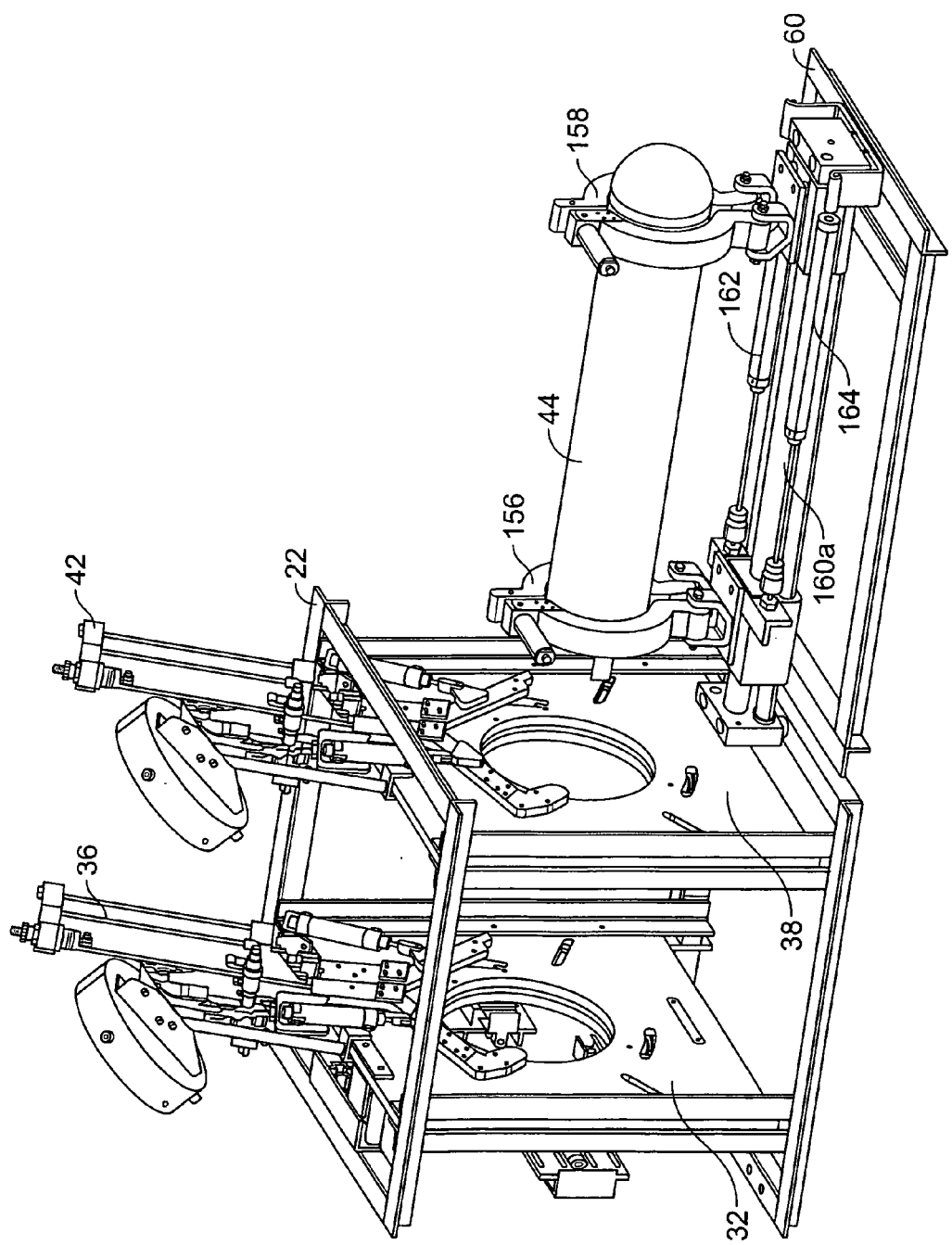
FIG. 8 is a perspective view of another embodiment of the mandrel of the present invention.

A view of a different embodiment of the mandrel 44 is shown in FIG. 8. In this view, the apparatus is shown from the opposite side as in FIGS. 1 through 6, so that the distal end 60 of frame 22 is to the right of the drawing. In this embodiment, mandrel 44 is carried on a lower rail 160*a*. The other components of the apparatus are the same as in the embodiment illustrated in FIGS. 1 through 6.

An electronic controller 56, preferably microprocessor based, controls all logic for the various components of the apparatus 20 and causes the various air cylinders to operate and the conveyor belts to advance. Alternatively, an analog control system could be implemented.

The operation of the apparatus 20 will now be described. First, netting 46 is mounted on the set of rollers 48 and manually pulled over the rollers 48. The mandrel 44 is mounted in the clamps 156, 158 when the distal clamp 158 and proximal clamp 156 are both in their first positions as shown in FIG. 1. The netting 46 must initially be manually pulled over the mandrel 44. To accomplish this task, the operator closes the grip of the proximal clamp 156 and opens the grip of the distal clamp 158. Thus, netting 46 can be pulled over the mandrel 44 as far as a position intermediate to the distal clamp 158 and the proximal clamp 156. Enough netting 46 should be pulled through to create some slack in the netting 46. The grip of the distal clamp 158 is then closed, securing the mandrel 44, and the grip of the proximal clamp 156 is opened, allowing the netting 46 to be pulled over the rest of the mandrel 44, taking up the slack left in the netting 46. Preferably, enough netting 46 has been pulled to leave some excess past the proximal end of the mandrel 44.

To begin operation, the proximal clamp 156 actuates to its closed grip. The distal clamp 158 actuates to its intermediate grip, and then moves from its first position to its second position, as shown in FIG. 4, bringing netting along with it and thereby bunching or "shirring" the netting 46 between the proximal clamp 156 and the distal clamp 158. The distal clamp 158 then actuates to its open grip, retracts back to its first position, as shown in FIG. 1, and actuates to its closed grip. The proximal clamp 156 now actuates to its open grip.

Figure 5:
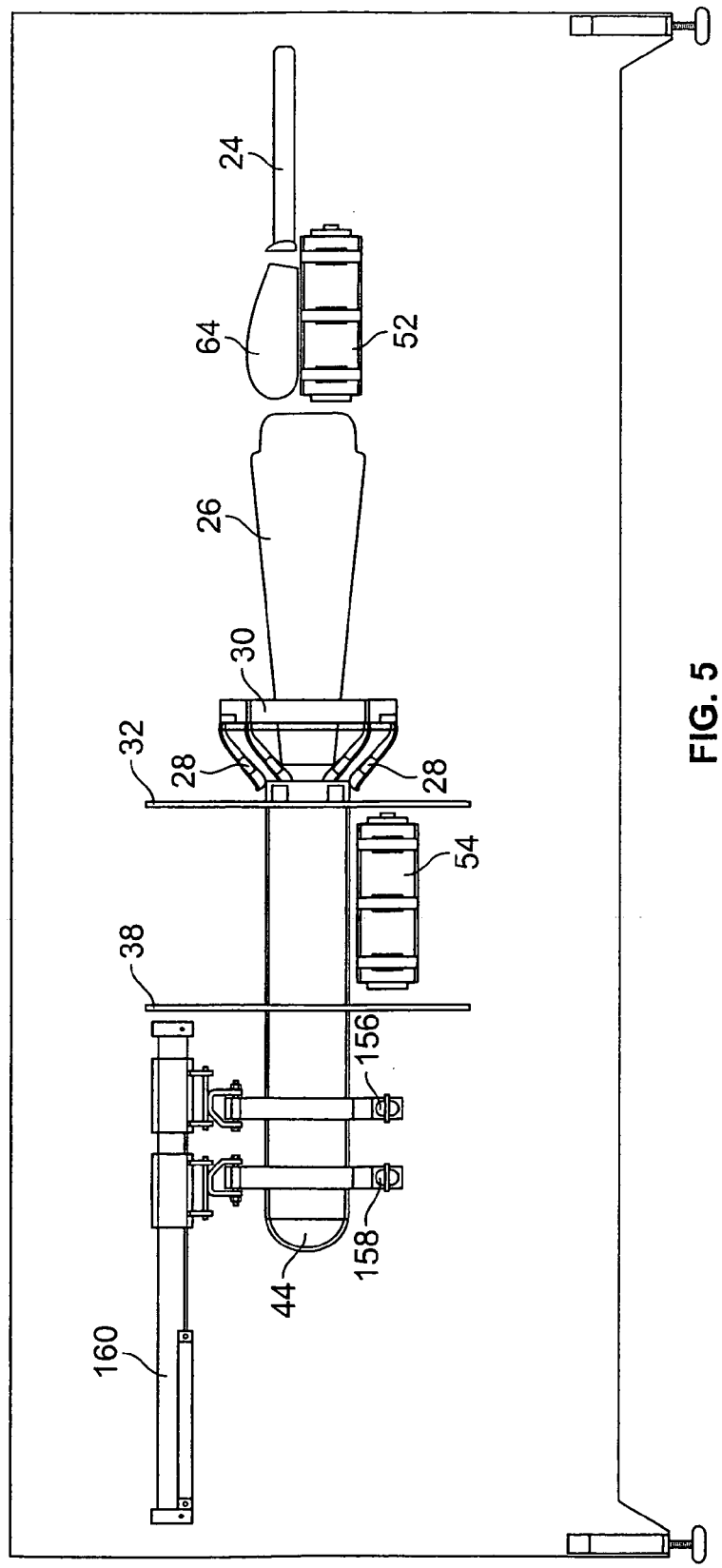
FIG. 5 is an elevation view of part of the apparatus of the preferred embodiment of the present invention, showing yet another configuration.

The distal clamp 158 next moves along its rail 160 to its second position as shown in FIG. 5. Since the distal clamp 158 is supporting the mandrel 44, this movement causes the mandrel 44 to move through the first and second gates 32, 38 to a position adjacent to the claws 28, which are in their closed position, as shown in FIG. 5. When the mandrel 44 is sufficiently close to the claws 28, the claw air cylinders 78 actuate to open the claws 28 outwardly. The claws 28 are aligned with the notches 154. This movement catches the netting 46 in the claws 28, so that the claws 28 securely hold the netting 46. The distal clamp 158 then retracts to its first position, taking the mandrel 44 back through the first and second gates 32, 38. Because the claws 28 hold the netting 46, and because there was excess netting 46 bunched up on the mandrel 44, and because clamp 156 is in its open position, a tube of netting 46 is created in the passage 138 between the first and second gates 32, 38.

In the meantime, a series of hams 64 are received on the product conveyor 52, which delivers the hams 64 into the apparatus 20. At this point the ram 24 is retracted to its first position and the product horn 26 is retracted to its first position, as shown in FIG. 1. When a ham 64 appears on the apparatus axis 166, the ram 24 operates to move the ham 64 into the product horn 26, as shown in FIG. 4. A photosensor, proximity switch, or other device can be used to determine when a ham 64 is in the appropriate position for insertion into the product horn 26. Alternatively, manual control can be used.

The product horn 26 moves through the collar 30 and through the first gate 32, into the tube of netting 46, preferably at the same time that the distal clamp 158 is retracting as described above. The ram 24 continues to push on the ham 64, so that the ham 64 remains located within the product horn 26, as shown in FIG. 2. Once the ham 64 is centered in the passage 138, the product horn 26 retracts to its first position, but the ram 24 remains extended, so that the ham 64 stays within the passage 138. Once the product horn 26 has fully retracted, the ram 24 also retracts, leaving the ham 64 within the tube of netting 46 in the passage 138.

Both the first iris 34 and the second iris 40 close, loosely gathering the netting 46 around he ham 64. The claws 28 can relax to their closed position at this point. The first clipper 36 clips the netting 46. In one embodiment, first clipper 36 merely clips netting 46. In another embodiment, first clipper 36 clips netting 46 and severs the excess netting proximal to the applied clip.

Figure 6:
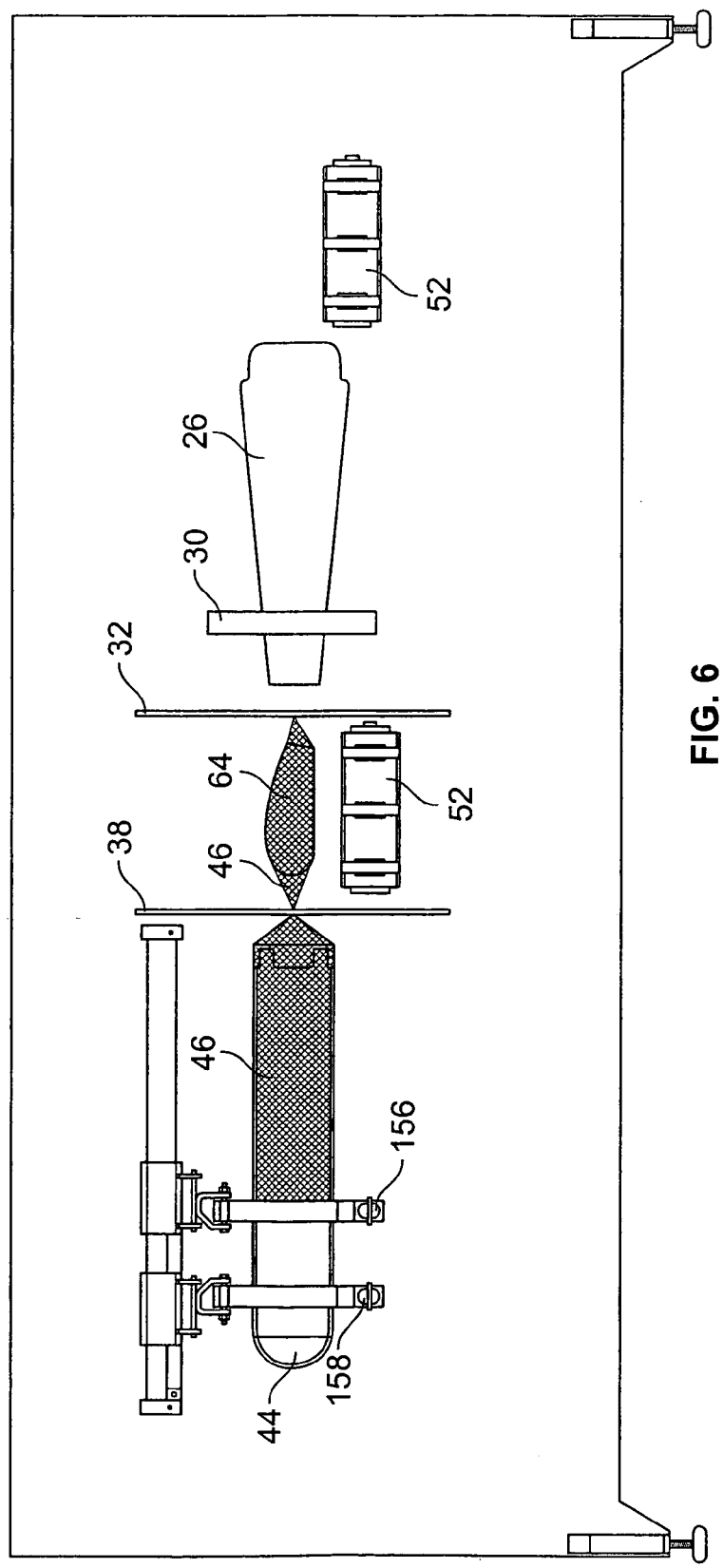
FIG. 6 is an elevation view of part of the apparatus of the preferred embodiment of the present invention, showing yet another configuration.

The proximal clamp 156 next actuates to its intermediate grip, so that it grips the netting 46. The proximal clamp 156 moves along its rail 160 toward its second position, thereby pulling the netting 46 through the closed second iris 40 and pulling the netting 46 tightly about the ham 64 as shown in FIG. 6. The proximal clamp 156 continues to move in a distal direction, pulling the netting 46 about the ham 64. This movement causes the ham 64 to be pulled against the second gate 38, so that the ham 64 is constrained by the closed second iris 40, and causes the netting 46 to be pulled tightly about the ham 64. The proximal clamp 156 ceases movement when the netting 46 is sufficiently tight about the ham 64. An adjustable pressure sensor can be utilized to determine when this limit has been reached. The second clipper 42 then clips the netting 46 and severs the netting 46, thereby creating a tightly-wrapped package. The now-netted ham 64 falls to finished product conveyor 54. Finished product conveyor 54 then operates to carry the now-netted ham 64 out of the passage 138.

The proximal clamp 156 then moves to its first position and actuates to its closed grip and the process can be repeated. The process can repeat continuously until the netting 46 on the trunnion mount 50 has been depleted. Since the netting 46 as sold by manufacturers is quite long, and far greater than the amount than can be rucked onto a netting tube, the time between interruptions to replenish netting 46 is greatly increased.

While preferred embodiments of the present invention are shown and described, it is envisioned that those skilled in the art may device modifications of the present invention without departing from the spirit and scope of the invention.

We claim:

1. An apparatus for encasing material in netting, comprising:
    a tube of netting having an open end;
    a first gate adjustable from an open position defining an aperture larger than the material, to a closed position gathering said netting extended through said aperture;
    a second gate adjustable from an open position defining an aperture larger than the material, to a closed position gathering said netting extended through said aperture; said first gate being spaced from said second gate to define a passage therebetween;
    a set of claws mounted on a collar and positioned proximal to said first gate;
    a mandrel mounted on a plurality of clamps, in axial alignment with a product horn, and being adapted to receive said tube of netting and to maintain said open end in an open position in axial alignment with and opposed to a distal end of said product horn, each of said clamps having an open setting so that said mandrel and said netting can move relative to said clamp, an intermediate setting so that said mandrel can move relative to said clamp and said netting cannot move relative to said clamp, and a closed setting so that said mandrel and said netting cannot move relative to said clamp;
    means to move said mandrel from a first position distal to said collar, through said gates to a second position wherein said claws engage said netting and hold said open end in an open position;
    means to move said product horn, from a first position proximal to said collar, to a second position in said passage;
    a ram to move the material into said product horn and to leave the material in said passage when said product horn moves from its said second position to its said first position;
    a first clipper associated with said first gate and positioned to clip said netting gathered by said first gate to close said open end;
    a second clipper associated with said second gate and positioned to clip and sever said netting gathered by said second gate.

2. The apparatus of claim 1, wherein said product horn comprises a duckbill.

3. The apparatus of claim 1, wherein said product horn comprises a plurality of blades.

4. The apparatus of claim 3, wherein said plurality of blades adjust to accommodate the material.

5. The apparatus of claim 3, wherein said plurality of blades are rotatably attached at a proximal end and biased inward at a distal end by biasing means, wherein said blades adjust to accommodate the material.

6. The apparatus of claim 1, further comprising a conveyor to deliver the material to a proximal end of said product horn.

7. The apparatus of claim 1, further comprising a conveyor to remove the material from said apparatus.

* * * * *